US010921899B2

(12) United States Patent
Verbeke et al.

(10) Patent No.: US 10,921,899 B2
(45) Date of Patent: Feb. 16, 2021

(54) INTERACTION SYSTEM USING COLLOCATED VISUAL, HAPTIC, AND/OR AUDITORY FEEDBACK

(71) Applicant: HARMAN INTERNATIONAL INDUSTRIES, INCORPORATED, Stamford, CT (US)

(72) Inventors: Joseph Verbeke, San Francisco, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/513,617

(22) Filed: Jul. 16, 2019

(65) Prior Publication Data

US 2021/0018985 A1 Jan. 21, 2021

(51) Int. Cl.
*G06F 3/01* (2006.01)
*H04N 9/31* (2006.01)

(52) U.S. Cl.
CPC ............. *G06F 3/017* (2013.01); *G06F 3/011* (2013.01); *G06F 3/016* (2013.01); *H04N 9/31* (2013.01)

(58) Field of Classification Search
CPC .......... G06F 3/017; G06F 3/011; G06F 3/016; H04N 9/31

USPC ........................................................ 345/156
See application file for complete search history.

(56) References Cited

U.S. PATENT DOCUMENTS

| 8,322,863 | B1* | 12/2012 | Cho | H04N 9/3185 |
| | | | | 353/70 |
| 9,465,484 | B1* | 10/2016 | Kamarshi | G06F 3/0425 |
| 2009/0262074 | A1* | 10/2009 | Nasiri | G06F 1/1626 |
| | | | | 345/158 |
| 2014/0269207 | A1* | 9/2014 | Baym | H04R 3/12 |
| | | | | 367/138 |
| 2015/0015607 | A1* | 1/2015 | Sodhi | G06F 3/0425 |
| | | | | 345/633 |

OTHER PUBLICATIONS

Hoshi et al. (T. Hoshi, M. Takahashi, T. Iwamoto and H. Shinoda, "Noncontact Tactile Display Based on Radiation Pressure of Airborne Ultrasound," in IEEE Transactions on Haptics, vol. 3, No. 3, pp. 155-165, Jul.-Sep. 2010, hereinafter "Hoshi" (Year: 2010).*

* cited by examiner

*Primary Examiner* — Mark Edwards
(74) *Attorney, Agent, or Firm* — Artegis Law Group, LLP

(57) ABSTRACT

A system for interacting with a computing device includes a visual projection system configured to project a visual output onto a projection surface and a haptic output device configured to deliver a haptic output to a surface of a body part of the user while the visual projection system projects the visual output onto the projection surface.

19 Claims, 5 Drawing Sheets

INTERACTION SYSTEM USING COLLOCATED VISUAL, HAPTIC, AND/OR AUDITORY FEEDBACK

BACKGROUND

Field of the Embodiments

Embodiments of the present disclosure relate generally to user interfaces and, more specifically, to an interaction system using collocated visual, haptic, and/or auditory feedback.

Description of the Related Art

Currently, touch-sensitive screens are commonly employed as the interface for interacting with consumer and hand-held display devices, such as smartphones, electronic tablets, wearable computing devices, and in-vehicle infotainment systems. A touch-sensitive screen enables a user to interact directly with what is displayed, rather than using a mouse, touchpad, or other such device, and allows a greater variety of inputs to a device than do mechanical input devices, such as buttons and switches. As a result, touch-sensitive screens have replaced most or all mechanical buttons, dials, keyboards, and sliders as the interface for interacting with a variety of devices.

One drawback to using a touch-sensitive screen as an input device is that performing an input requires the user to focus attention visually on the touch-sensitive screen, which in many situations is impracticable. For example, in an automotive application, looking down at the touch-based screen of an in-vehicle infotainment system for a significant length of time can be distracting or even dangerous. Another drawback to using a touch-sensitive screen as an input device is that the input-receiving surface of the screen is necessarily limited to the size of the device in which the screen is included. Thus, on certain electronic devices that continue to decrease in size (e.g., wearable electronics), the interactive space of a touch-sensitive screen is extremely small, greatly limiting the ability of the user to interact with the device.

In light of the above, more effective techniques for interacting with electronic devices would be useful.

SUMMARY

The various embodiments set forth a system for interacting with a computing device. The system includes a visual projection system configured to project a visual output onto a projection surface; and a haptic output device configured to deliver a haptic output to a surface of a body part of the user while the visual projection system projects the visual output onto the projection surface.

At least one advantage of the disclosed embodiments is that a user can provide input to a computing device via mid-air, non-contact gestures that do not require the user to visually focus on a touchscreen or other input device. In addition, mid-air gestures are not limited by the size of the computing device receiving the input. A further advantage is that a user can receive an acknowledgment of such non-contact input from the computing device via multiple feedback modes that do not require the user to visually focus on a display device. Instead, in the embodiments, feedback modes are employed that are based on the user's peripheral vision, sense of touch, and/or hearing.

BRIEF DESCRIPTION OF THE SEVERAL VIEWS OF THE DRAWINGS

So that the manner in which the above recited features of the one or more embodiments can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
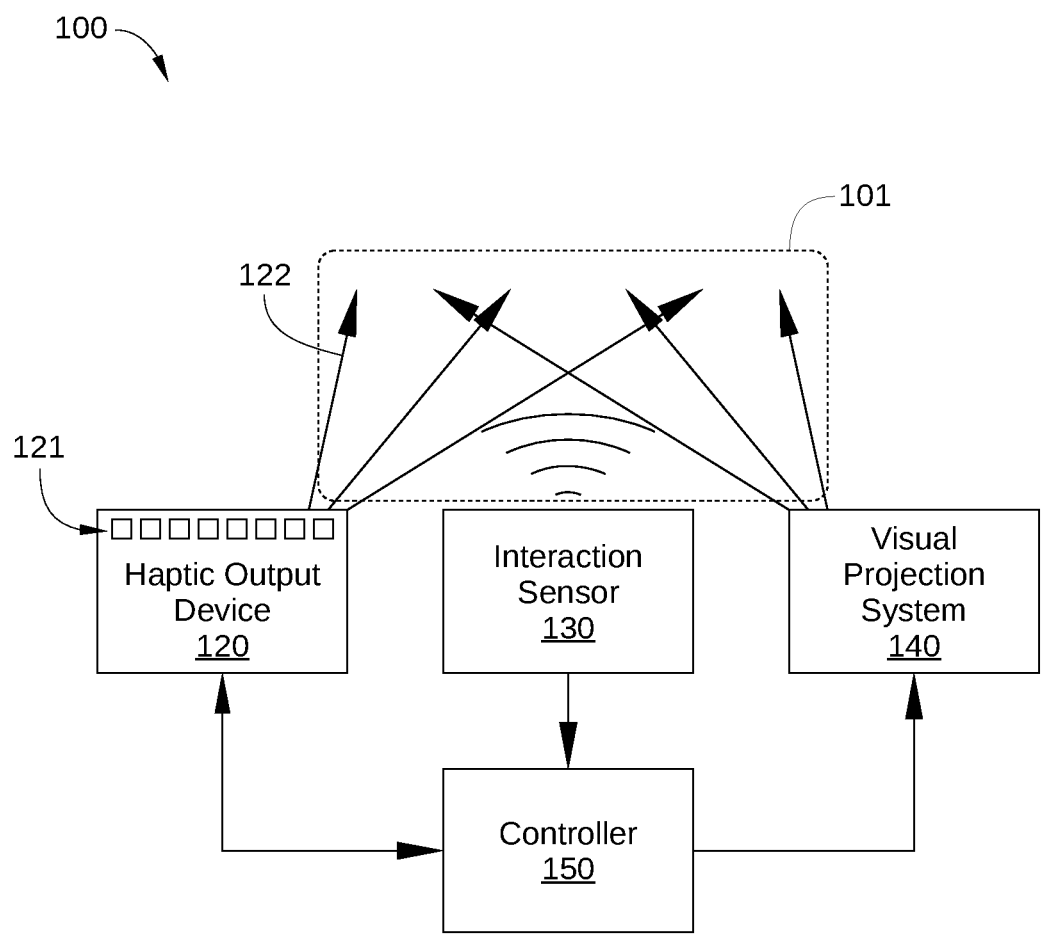
FIG. 1 is a schematic diagram illustrating an interaction system, configured to implement one or more aspects of the present disclosure, according to various embodiments.

FIG. 1 is a schematic diagram illustrating an interaction system 100, configured to implement one or more aspects of the present disclosure, according to various embodiments. Interaction system 100 enables a user to provide input to a computing device and receive acknowledgment of such input without visually focusing on an input device. More specifically, interaction system 100 allows a user to interact with a computing device via mid-air, non-contact gestures and to receive visual, haptic, and/or auditory feedback directly on, or seemingly coming from, the gesturing body part. Thus, interaction system 100 is a closed-loop gestural system that senses the gestures of a user and at the same time provides visual, haptic, and/or auditory feedback that is collocated on the gesturing body part, creating input-output coincidence during interactions. Because feedback is collocated on the body part performing a gesture-based input, interactions using interaction system 100 are intuitive and immediate, creating an advanced user interface technology applicable to many applications, including, without limitation, automotive, wearable electronics, smart speakers, the Internet of Things (IoT), and conference call systems, among others.

Interaction system 100 includes, without limitation, a haptic-acoustic output device 120, an interaction sensor 130, a visual projection system 140, and a controller 150. An interaction region 101 is disposed proximate, but not necessarily adjacent to, interaction system 100. In operation, interaction system 100 detects the presence of a user hand, finger, or other body part (not shown in FIG. 1) within interaction region 101, and directs collocated visual, haptic, and/or auditory feedback to the user body part upon such detection. Thus, the user is notified that a body part of the user is in interaction zone 101 without visually focusing on the gesturing part or on an element of interaction system 100. In some embodiments, interaction system 100 also directs visual, haptic, and/or auditory feedback to the gesturing body part to acknowledge subsequent gestures performed by the gesturing body part. In some embodiments, interaction system 100 is further configured to determine a current location within interaction region 101 of the gesturing body part and/or to determine a particular gesture being performed by the gesturing body part and to acknowledge the particular gesture with additional visual, haptic, and/or auditory feedback directed to the gesturing body part.

Haptic-acoustic output device 120 is configured to generate haptic feedback onto a surface of a user body part that is at a distance from haptic-acoustic output device 120, such as mid-air haptic sensations created on a surface of a user body part (e.g., a gesturing hand or finger). In addition, in embodiments in which audible feedback is provided by interaction system 100, haptic-acoustic output device 120 is configured to generate highly directional sounds that are reflected from the surface of the user body part. Alternatively or additionally, in such embodiments, haptic-acoustic output device 120 can also be configured to generate such directional sounds to be reflected from a surface proximate to and in contact with the user body part, such as a projection surface on which interaction regions are displayed. Thus, haptic-acoustic output device 120 can generate collocated haptic and audible feedback on a surface of a gesturing body part when a gesture is recognized by interaction system 100.

Haptic-acoustic output device 120 can include, without limitation, one or more types of devices that can detect and generate one or more types of waves (e.g., mechanical waves, electromagnetic waves, etc.). For example, in some embodiments, haptic-acoustic output device 120 includes an array of haptic output devices 121 that can generate and/or detect ultrasonic waves, such as continuous waves, wave pulses, pings, and the like. Haptic output devices 121 generate continuous waves or emit wave pulses that generate a haptic sensation on a surface of a user, in particular on a surface of a gesturing body part of the user. In some embodiments, haptic output devices 121 are also configured to generate and/or detect waves that can be used to determine the location of an object in interaction region 101. Thus, in embodiments in which haptic output devices 121 are configured to create haptic feedback, acoustic signals, and sense ultrasound (for example for gesture sensing), each haptic output device 121 may include an acoustic transducer configured to create haptic feedback and acoustic signals and to sense ultrasound. Alternatively, each haptic output device 121 can be a combination of a mid-air haptic actuator (such as an air vortex, a pneumatic actuator, an air bladder and/or any other type of device configured to generate haptic output remotely from haptic-acoustic output device 120), a directional audio generator, and a gesture sensor.

In various embodiments, haptic output devices 121 receive one or more control signals from controller 150 indicating how one or more parameters of each particular haptic output device 121 is to be configured. The one or more parameters include, without limitation, the intensity of the haptic output 122 to be generated by that particular haptic output device 121 and/or directionality parameters for that particular haptic output device 121. In some embodiments, controller 150 may modify the phase of the haptic output 122 from multiple haptic output devices 121 to control the directionality of the haptic output. For air output devices, controller 150 may also control one or more pan-tilt actuation parameters to generate air output in one or more directions.

Based on control signals from controller 150, haptic output devices 121 generate haptic output corresponding to a particular haptic sensation on a surface of a body part of a user. For example, haptic output devices 121 can generate haptic output with a certain frequency, phase, intensity, etc. The result of such haptic output interacting with a user's skin is a haptic sensation generated on a particular surface of a body part of the user, and such a haptic sensation can be controlled to have a certain area of effect, intensity, shape, orientation, and so forth. In addition, haptic output devices 121 may generate haptic sensations on a body part of a user that follow a user's movements within interaction region 101 and/or that move in a particular manner relative to the position of the user. Furthermore, in some embodiments, haptic output devices 121 may generate feedback data in conjunction with generating haptic output, the feedback data indicating the type of haptic sensation that is generated. Haptic output devices 121 may transmit such feedback data to controller 150.

In embodiments in which audio feedback is projected onto a surface of a gesturing body part of a user, haptic-acoustic output device 120 is further configured to generate highly directional sounds that are reflected from a particular surface of a gesturing body part of the user. In such embodiments, one or more of haptic output devices 121 is configured to direct an ultrasonic signal to the particular body part surface. Specifically, the ultrasonic signal is configured to demodulate, upon delivery to the body part surface, to an audible output that is perceived by the user to emanate from that particular body part surface. In such embodiments, collocation of audio feedback and haptic feedback to the user is created at a location on the user's body that is employed in performing an input. For example, in an embodiment in which a user interface is visually projected onto a palm or hand of the user, audio and haptic feedback is generated simultaneously at the location of an input being executed (e.g., on the palm or the inputting finger) when the input (e.g., depression of a virtual button) is executed by the user. Thus, the user experiences immediate and intuitive feedback from a projected/virtual input area of the projected user interface.

Interaction sensor 130 is configured to detect the presence of a gesturing body part within interaction region 101, such as a hand or finger, and transmit a suitable signal to controller 150. In some embodiments, interaction sensor 130 is further configured to determine a current location within interaction region 101 of the gesturing body part and/or to determine a particular gesture being performed by the gesturing body part. Thus, interaction sensor 130 includes one or more sensors capable of detecting the presence of a gesturing body part within interaction region 101 and/or sensing the current position of the gesturing body part within interaction region 101, and/or detecting a specific gesture or gestures performed by a user with the gesturing body part within interaction region 101. In some embodiments, interaction sensor 130 includes one or more projection surface sensor configured to generate shape and orientation information associated with the projection surface. Examples of suitable sensors include, without limitation, proximity sensors, depth sensors (e.g., time-of-flight or structured light sensors), infra-red and/or red-green-blue (RGB) imagers, ultrasonic-based sensors, and the like. It is noted that for embodiments in which a user interface, audio feedback, or haptic feedback is projected onto a surface of a body part of a user, interaction sensor 130 includes one or more sensors capable of measuring a current location of the body part and/or the current orientation of the body part.

In some embodiments, one or more of the sensors of interaction sensor 130 are included in haptic output devices 121 of haptic-acoustic output device 120. In such embodiments, some or all of the functionality of interaction sensor 130 is included in haptic-acoustic output device 120. Examples of such haptic output devices are described in greater detail in U.S. patent application Ser. No. 16/319,330, entitled "Echolocation with Haptic Transducer Devices," filed Jan. 19, 2019, the teachings of which are incorporated by reference herein.

Visual projection system 140 is a micro projection system that creates a visual projection onto a projection surface within interaction region 101. The visual projection can include, without limitation, a user interface projected onto a user's hand, palm, or other surface; a visual acknowledgment indicator, such as a flashing light or a light of a particular color; or a projected image that is a component of a haptic object simulated to be near or in contact with a body part of the user. Visual projection system 140 can include any technically feasible projection system that enables such a projection to be generated, such as a micro or nano projector module or a short-throw projector. In an automotive application, visual projection system 140 can be disposed in the ceiling, door, dashboard, or other suitable location that enables projection of a projected user interface and/or a visual acknowledgment indicator onto a suitable projection surface. In a home application, visual projection system can be mounted remotely from other components of interaction system 100 to facilitate projection onto a suitable projection surface. In other embodiments, visual projection system can be incorporated into a wearable electronic device or head-mounted device.

Figure 2:
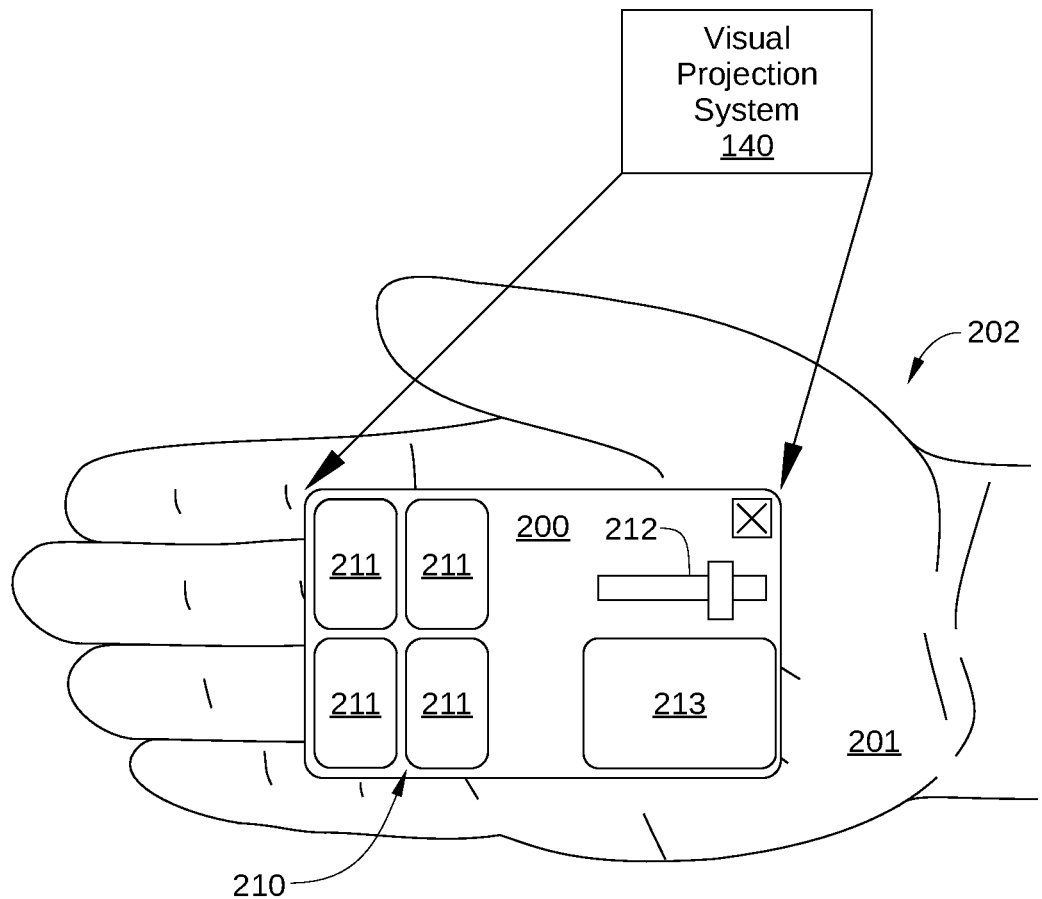
FIG. 2 is a schematic diagram illustrating a projected user interface, according to the one or more embodiments of the present disclosure.

In some embodiments, visual projection system 140 is configured to generate a projected user interface onto a user's hand or palm. An embodiment of one such projected user interface is illustrated in FIG. 2. FIG. 2 is a schematic diagram illustrating a projected user interface 200, according to the one or more embodiments of the present disclosure. Projected user interface 200 is projected onto a surface 201 of a user body part 202, to enable interaction with interaction system 100. In the embodiment illustrated in FIG. 2, body part 202 is a palm of a user hand, but in other embodiments, any other suitable surface of a body part of a user can be employed as a projection surface, such as the back of the hand, the arm, etc. In embodiments in which haptic feedback is to be directed to regions of the projection surface, when the projection surface is a skin surface of the user, the haptic feedback created on the projection surface is generally more clearly felt by the user than when the projection image is on a clothed body part of the user.

In some embodiments, projected user interface 200 is displayed onto surface 201 when controller 150 determines that body part 202 is disposed within a specified interaction region associated with interaction system 100, such as interaction region 101 in FIG. 1. Alternatively or additionally, in some embodiments, visual projection system 140 projects projected user interface onto a fixed surface, such as a region of an automotive dashboard, or a suitable surface proximate a smart speaker that includes interaction system 100, such as a wall or a table top.

As shown, projected user interface 200 can include one or more input regions 210 that are analogous to inputs associated with touch-screen user interfaces. To wit, in some embodiments, input regions 210 can include one or more projected buttons 211, sliders 212, movable, changeable, or draggable, windows 213, and the like. In the embodiment illustrated, when the user executes an input by gesturing to or on a button 211 or other input region 210 of the user interface, visual projection system 140 causes the projected user interface to be modified with a visual acknowledgment indicator, such as a flashing light, change in the color or appearance of the input region 210, etc.

Returning to FIG. 1, controller 150 can be any computing device or other computational platform configured to execute instructions for the operation of haptic-acoustic output device 120, interaction sensor 130, and visual projection system 140 as described herein. One embodiment of controller 150 is described below in conjunction with FIG. 3.

Figure 3:
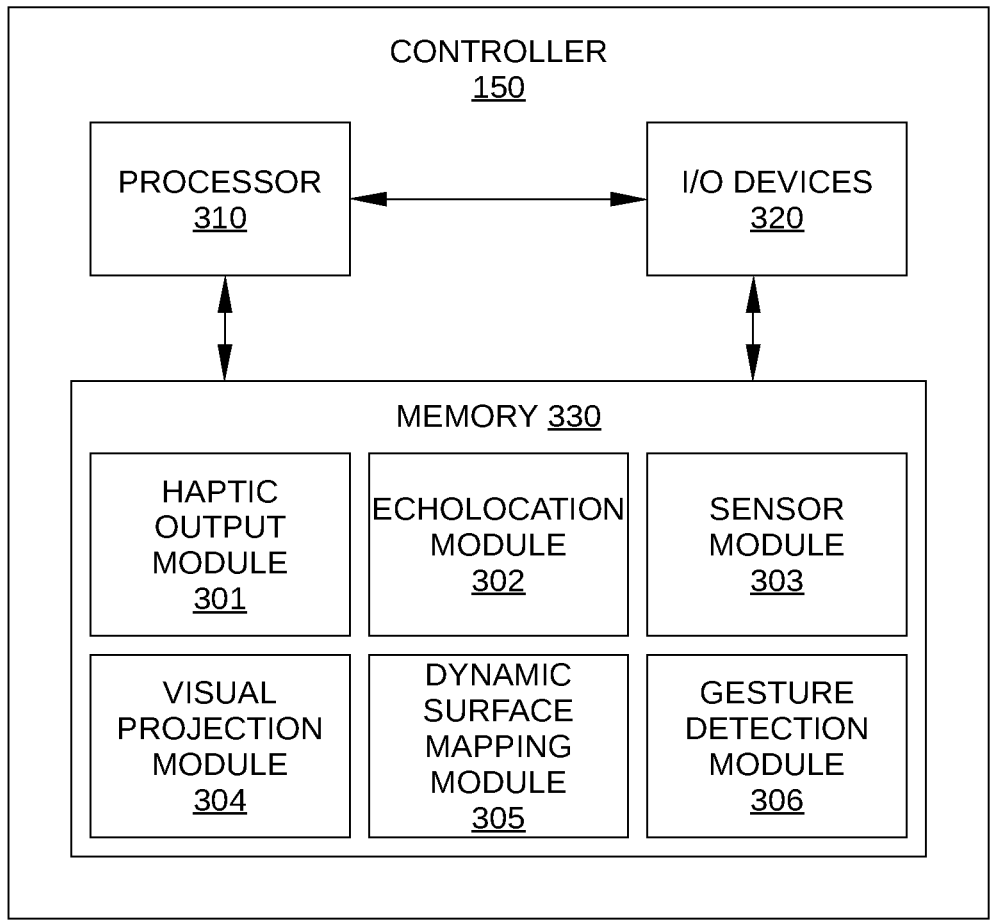
FIG. 3 is a conceptual block diagram of a controller of the interaction system of FIG. 1, according to an embodiment of the present disclosure.

FIG. 3 is a conceptual block diagram of controller 150, according to an embodiment of the present disclosure. Controller 150 is configured to implement at least one aspect of the present disclosure described herein. Controller 150 may be any type of device capable of executing application programs including, without limitation, instructions associated with a haptic output module 301, an echolocation module 302, a sensor module 303, a visual projection module 304, a dynamic surface mapping module 305, and/or a gesture detection module 306. For example, and without limitation, controller 150 may be an electronic tablet, a smartphone, a laptop computer, etc. Alternatively, controller 150 may be implemented as a stand-alone chip, such as a microprocessor, or as part of a more comprehensive solution that is implemented as an application-specific integrated circuit (ASIC), a system-on-a-chip (SoC), and so forth. Generally, controller 150 is configured to coordinate the overall operation of interaction system 100. As shown, controller 150 includes, without limitation, a processing unit 310, input/output (I/O) devices 320, and a memory device 330.

Processing unit 310 may be implemented as a central processing unit (CPU), a graphics processing unit (GPU), an ASIC, a field programmable gate array (FPGA), any other type of processing unit, or a combination of different processing units. In general, processing unit 310 may be any technically feasible hardware unit capable of processing data and/or executing software applications to facilitate operation of interaction system 100 of FIG. 1, as described herein. Processing unit 310 may be physically embedded in controller 150, may be part of a cloud-based computing environment, and/or may be part of a computing device external to interaction system 100, such as a mobile computing device or a wearable computing device. In some embodiments, processing unit 310 is an element of an in-vehicle infotainment system within a vehicle, including, without limitation, a car, a truck, a motorbike, a boat, a submarine, a personal watercraft, a snow mobile, an aircraft, and so forth. Among other things, and without limitation, processing unit 310 may be configured to execute instructions associated with haptic output module 301, echolocation module 302, sensor module 303, visual projection module 304, dynamic surface mapping module 305, and/or gesture detection module 306.

Haptic output module 301 controls operation of haptic-acoustic output device 120, including selecting a type of haptic sensation to generate on a surface of a body part within interaction region 101. For example, haptic output module 301 determines the frequency, intensity, location, size, movement, pattern, direction, shape, etc. of a haptic sensation to be generated on the surface of the body part. In addition, haptic output module 301 causes one or more of haptic output devices 121 to generate the selected haptic sensation on the body part of the user.

Echolocation module 302 controls operation of haptic-acoustic output device 120 in embodiments in which interaction system 100 is configured to detect a current location within interaction region 101 of a gesturing body part. For example, in such embodiments, echolocation module 302 may perform the generation of certain pings or other waves, the detection of reflected waves, and the determination of the location of an object within interaction region 101 based on the detection of the reflected waves.

Sensor module 303 controls operation of interaction sensor 130. In some embodiments, when interaction sensor 130 generates sufficient location information associated with a body part disposed within interaction region 101, sensor module 303 also determines a current location of the body part. Alternatively or additionally, in some embodiments, when interaction sensor 130 generates sufficient shape and/or orientation information associated with a body part disposed within interaction region 101, sensor module 303 also determines a current gesture being executed by the body part.

Visual projection module 304 controls operation of visual projection system 140. Thus, during operation, visual projection module 304 causes visual projection system 140 to visually project a certain visual projection onto a projection surface, such as a surface of a body part detected in interaction region 101. In some embodiments, the visual projection includes a projected user interface, such as projected user interface 200 in FIG. 2. In other embodiments, the visual projection includes a visual acknowledgment indicator, such as a flashing light or illumination of a certain color. For instance, in an embodiment in which the projection surface is a surface of a user hand, visual projection module 304 causes the surface of the user hand to be illuminated in light of a first color when the user hand is detected to be within interaction region 101. Furthermore, when a certain gesture is executed by the hand and sensor module 303 or gesture detection module 306 determines the gesture, visual projection module 304 causes the surface of the user hand to be illuminated in light of a second color, so that the user can receive acknowledgment of the gesture from interaction system 100 via peripheral vision.

Dynamic surface mapping module 305 is configured to determine a current shape of a projection surface, such as a surface of a body part detected in interaction region 101, based on shape and/or orientation information associated with the projection surface. In addition, in some embodiments, dynamic surface mapping module 305 is configured to modify a visual projection to be generated by visual projection system 140 so that the visual projection is suitably mapped to the geometry of the current shape of the projection surface. Thus, even when the visual projection is projected onto a projection surface that is irregular and/or obliquely oriented (with respect to a user), the visual projection can still have a coherent and useful appearance to the user. That is, the visual projection can still have a coherent and useful appearance to the user when the visual projection is projected onto a projection surface that substantially distorts the visual output when the unmodified visual output is projected thereon.

Gesture detection module 306 is configured to determine a current gesture being executed by a body part of a user that is currently disposed within interaction region 101. Specifically, gesture detection module 306 is configured to analyze sensor data acquired via one or more sensors to determine a position and/or orientation of one or more parts of a user (e.g., a user's hand, finger, wrist, arm, etc.). Gesture detection module 306 can make such a determination based on position information, shape information, and/or orientation information associated with the body part of the user. Such information can be received from haptic-acoustic output device 120 and/or from interaction sensor 130.

Memory 330 may include a random access memory (RAM) module, a flash memory unit, or any other type of memory unit or combination thereof, and may include a single memory module or a collection of memory modules. As shown, in some embodiments, some or all of haptic output module 301, echolocation module 302, sensor module 303, visual projection module 304, dynamic surface mapping module 305, and/or gesture detection module 306 may reside in memory 330 during operation.

I/O devices 320 includes at least one device capable of both receiving input, such as a keyboard, a mouse, a touch-sensitive screen, a microphone and so forth, as well as devices capable of providing output, such as a display screen, loudspeakers (including a loudspeaker associated with a headphone-based system), and the like. The display screen may be incorporated in interaction system 100 or may be external to interaction system 100, such as a computer monitor, a video display screen, a display apparatus incorporated into a separate hand held device, or any other technically feasible display screen. It is noted that I/O devices 320 include I/O devices for inputs to and outputs from interaction system 100, and are distinct from the closed-loop I/O gestural system that interaction system 100 enables. That is, interaction system 100 is itself an I/O device for some other system, such as an in-vehicle infotainment system, a smart speaker, a teleconference system, a wearable computing device, etc.

In the embodiment illustrated in FIG. 3, controller 150 is shown as a single integrated device. In other embodiments, some or all of the functionality of controller 150 described herein can be implemented as multiple computing devices, such as a computing device integrated into haptic-acoustic output device 120, a computing device integrated into interaction sensor 130, and/or a computing device integrated into visual projection system 140.

As noted above, in some embodiments, interaction system 100 is configured to provide multiple modes of feedback or output onto a suitable projection surface, including audio, visual, and haptic. For example, such multi-modal feedback can be projected in response to a body part of a user being detected within interaction region 101 or to a gesture being executed by the body part. One such embodiment is illustrated in FIG. 4.

Figure 4:
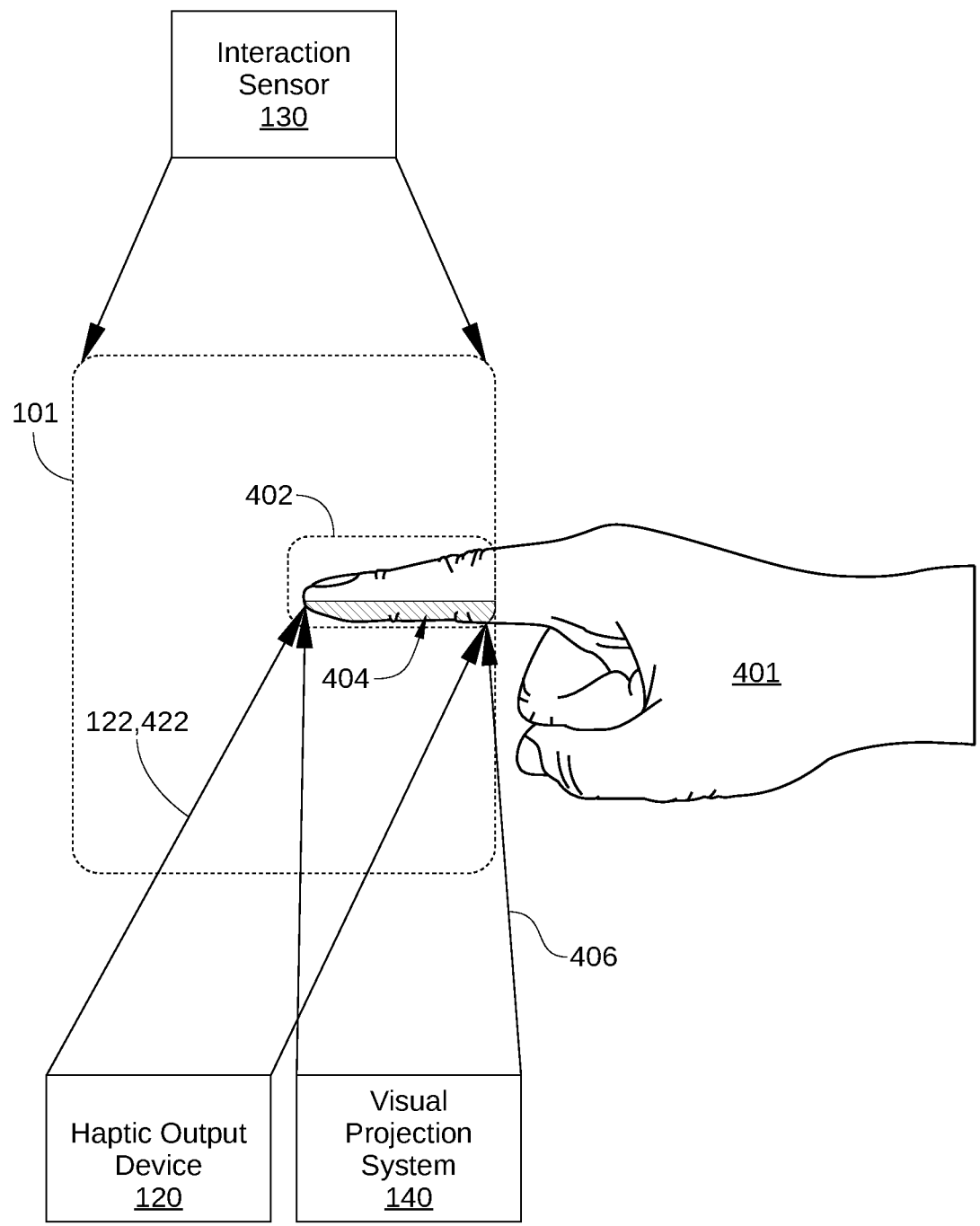
FIG. 4 schematically illustrates multiple modes of feedback being projected onto a portion of a body part, according to one or more embodiments of the present disclosure.

FIG. 4 schematically illustrates multiple modes of feedback being projected onto a portion of a body part 401, according to one or more embodiments of the present disclosure. As shown, a portion 402 of body part 401 is disposed within interaction region 101, and is detected by interaction sensor 130. In response, haptic-acoustic output device 120 directs haptic output 122, such as ultrasonic waves, to a surface 404 of portion 402. Alternatively or additionally, in some embodiments, haptic-acoustic output device 120 simultaneously directs audio output, via ultrasonic waves 422, to surface 404. Because ultrasonic waves 422 are configured to demodulate to suitable audible feedback when incident on surface 404, a user perceives audio feedback originating from approximately the same location as the haptic sensation induced by haptic output 122. Alternatively or additionally, in some embodiments, visual projection system 140 simultaneously directs a visual acknowledgment indicator 406 onto surface 404, such as illumination via a certain color and/or behavior (e.g., flashing). Thus, in some embodiments, surface 404 of body part 401 is a region in which two or more modes of feedback are perceived to be collocated by the user.

In the embodiment illustrated in FIG. 4, surface 404 is a portion of a finger. In another embodiment, surface 404 includes a larger surface, for example the entire lower surface of a user's hand. In such an embodiment, when the user's hand is extended into interaction region 101, most or all of the lower surface of the hand is illuminated, providing a peripheral vision-based cue to the user that the hand is within interaction region 101. In addition, in such an embodiment, some or all of the lower surface of the hand can receive haptic feedback 422 to simulate a haptic object. That is, when the user's hand enters interaction region 101, the user receives haptic feedback that is collocated with the visual feedback as a cue to the user that the hand is within interaction region 101.

Further, in some embodiments, different haptic feedback can be directed to the user's hand (or other surface) in response to execution of certain gestures by the user's hand (or other body part), thereby enabling inputs to be performed by the user without focusing visually on the hand or on a visual user interface. For example, the initial haptic feedback indicating that the user's hand is within interaction region 101 can simulate the feel of a particular object, such as a ball. Then, when certain subsequent gestures are executed by the user's hand, a different and/or additional haptic feedback can be directed to the hand to indicate that the haptic object has been positioned or oriented in such a way that a certain input has been received by interaction system 100. For instance, the different or additional haptic feedback can be a haptic click, a simulated movement, vibration, or rotation of the haptic object, or any other haptic input that is readily distinguishable from the initial haptic feedback. Thus, a user can execute multiple different inputs into interaction system 100 and receive a different respective acknowledging feedback from interaction system 100 without visually focusing on a screen or other interface device.

In the embodiment illustrated in FIG. 4, the projection surface for haptic feedback is a surface of a body part of the user. In other embodiments, such a projection surface for haptic feedback can be a surface that does not include a surface of a body part of the user. In such embodiments, haptic-acoustic output device 120 may direct haptic feedback to a portion of a projection surface that is contacted by the body part of the user. For example, when the visual projection surface on which a user interface is visually projected is separate from a body part of a user, such as a console surface, a table top, an arm rest, or a steering wheel, haptic-acoustic output device 120 can direct haptic feedback to a suitable portion of the surface that is proximate a hand or finger of the user contacting the surface. In this way, the user can still experience some haptic feedback indirectly when the projection surface for visual projection system 140 is not on a body part of the user.

Embodiments of interaction system 100, as described herein, can be used for a variety of applications. In some embodiments, interaction system 100 can be incorporated into a conventional or autonomous vehicle for facilitating infotainment interactions and general interactions with the vehicle. For example, in such embodiments, portions of interaction system 100 can be built into the dash board, arm rest, hand hold, steering wheel, knob-shaped interior structural element, trim piece, etc., of the vehicle.

In some embodiments, interaction system 100 can be implemented in a body-worn device that is capable of sensing the user's hands and generating audio, visual, and/or haptic feedback in a portable form. In some embodiments, interaction system 100 can be implemented as a table-top device to be used as a standalone system, such as a home control device that enables remote interactions with IoT devices. In some embodiments, interaction system 100 can be integrated into existing electronic devices, such as speakers, conferencing systems, alarm clocks, headphones, shoulder worn headphones, and augmented reality glasses. For example, the additional in-situ projection of haptic and audio feedback onto hands could complement the rendering system of the augmented reality glasses. In some embodiments, interaction system 100 can be integrated into articles of clothing, including, but not limited to a jacket, a belt buckle, a necklace, a safety helmet, and the like. Alternatively or additionally, in some embodiments, the detection of the presence of a user body part within interaction region can initiate execution of a specified action or process, such as disabling/enabling an alarm, switching a light or other device on or off, etc.

In some embodiments, interaction system 100 is integrated into a home control device that enables remote interactions with IoT devices and other home devices, such as a stereo, TV, and the like. As described herein, interaction system 100 provides up to three collocated forms of feedback to a user. For example, in one use case, a user is listening to music in bed with an embodiment of interaction system 100 placed on a night stand. Alternatively, interaction system 100 can be integrated into the night stand, an alarm clock on the night stand, or a portable speaker on the night stand. When the user raises a hand, a volume control graphical user interface is projected on a surface of the user's palm. With the other hand, the user taps volume up or down by touching the appropriate projected input region included in the graphical user interface. The user feels a haptic sensation on the palm at the location of the tapped input region and, in some embodiments, the user also hears an audible sound, such as a button click, apparently emanating from the tapped input region. Alternatively or additionally, a visual toggle of the tapped input region/button is also simultaneously displayed on the palm of the user.

In some embodiments, interaction system 100 is integrated into a vehicle, for example as a component of an in-vehicle infotainment system. Example functionality of such embodiments, as a user is sitting in the front seat of the vehicle, can include the following. When the user extends a hand over an interaction area near the center console, interaction system 100 detects the user's hand through a gesture sensor and activates one or more output feedbacks, including, but not limited to, haptic, audible, and/or visual feedback. Specifically, an ultrasonic transducer array outputs a continuous pulsating haptic focal point on the user's hand to indicate that the hand is correctly positioned for interacting with interaction system 100. In addition, at the moment the user's hand enters the interaction region, interaction system 100 generates an audible notification to confirm to the user a body part has entered the interaction region. The audible notification is demodulated on the user's hand, and therefore is perceived to emanate from the hand. Further, visual projection system 140 of interaction system 100 displays a pulsating blue light on the user's hand, synced in time to the oscillation of the haptic feedback and at the same location at which the haptic sensation is felt by the user and on which the auditory notification is demodulated. The user then performs a gesture, for example to modulate an environmental control, to activate a feature of an infotainment system, etc. Different haptic, auditory, and/ or visual feedback is projected onto the gesturing hand to confirm to the user that the gesture was successfully recognized.

Figure 5:
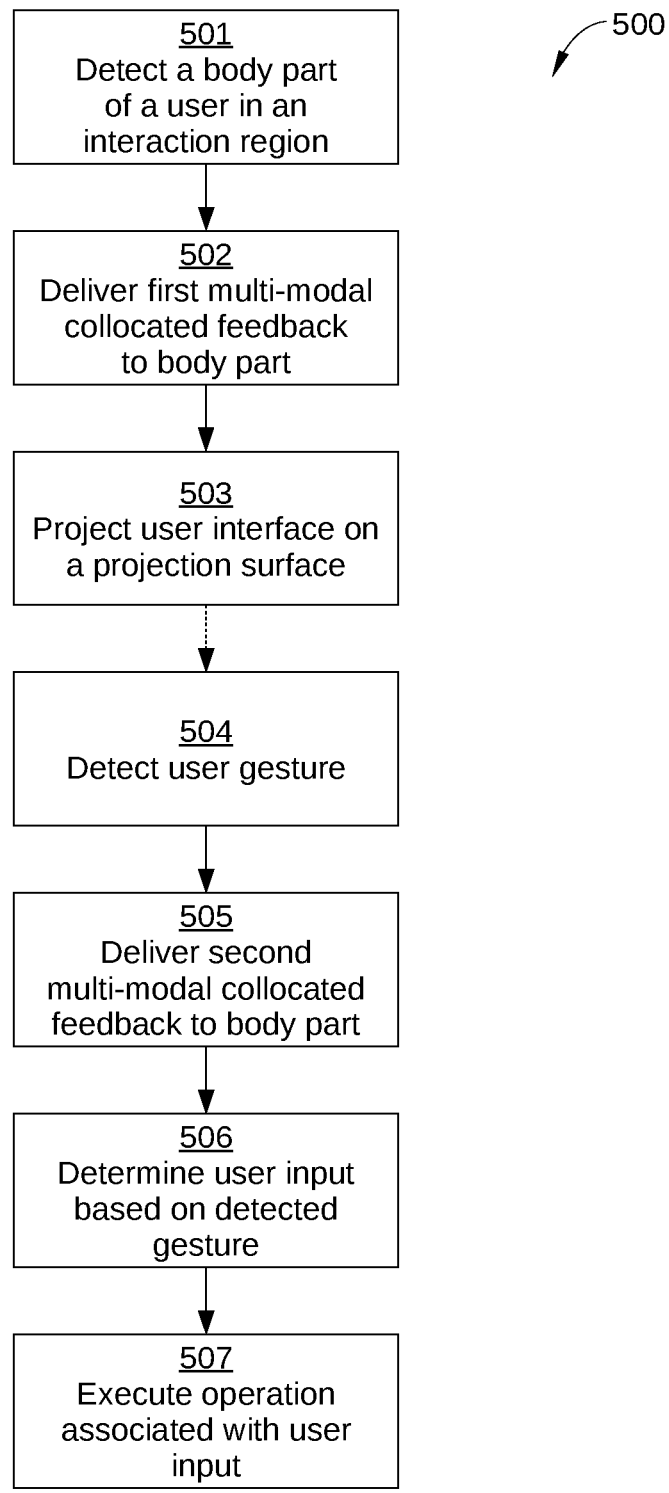
FIG. 5 is a flowchart of method steps for interacting with a computing device, according to various embodiments of the present disclosure.

FIG. 5 is a flowchart of method steps for interacting with a computing device, according to various embodiments of the present disclosure. Although the method steps are described with respect to the systems of FIGS. 1-4, persons skilled in the art will understand that any system configured to perform the method steps, in any order, falls within the scope of the various embodiments.

As shown, a method 500 begins at optional step 501, in which interaction system 100 detects a body part of a user, such as a hand or finger, in interaction region 101.

In step 502, in response to detecting the body part, interaction system 100 acknowledges detection of the body part by delivering a first multi-modal, collocated feedback to the body part, including haptic, visual, and/or audible feedback. In some embodiments, the visual feedback is configured so that a user can detect the feedback via peripheral vision rather than by visually focusing on an interface. In other embodiments, a user may receive such visual feedback by visually focusing on a projected user interface.

In step 503, in response to detecting the body part, interaction system 100 projects a projected user interface on a projection surface, such as a surface of the body part.

In step 504, interaction system 100 detects a user gesture, such as the body part touching an input region of the projected user interface or the body part performing a certain gesture or motion.

In step 505, in response to detecting the user gesture, interaction system 100 acknowledges detection of the user gesture by delivering a second multi-modal, collocated feedback to the body part, including haptic, visual, and/or audible feedback.

In step 506, in response to detecting the user gesture, interaction system 100 determines a user input based on the detected gesture. For a particular detected user gesture, interaction system 100 may determine a different user input based on various factors, including in what system interaction system 100 is incorporated; who the current user is and what the current user's personal settings indicate; with what application the current user is currently interacting; etc.

In step 507, interaction system 100 executes the operation associated with the user input or causes the execution of the operation. In some embodiments, interaction system 100 provides additional multi-modal feedback to the user in conjunction with execution of the operation.

In sum, various embodiments set forth systems and techniques for interacting with a computing device. In the embodiments, a closed-loop gestural system senses the gestures of a user and at the same time provides visual, haptic, and/or auditory feedback that is collocated on a surface of the gesturing body part, thereby creating input-output coincidence during interactions.

At least one technological improvement of the disclosed embodiments is that a user can provide input to a computing device via mid-air, non-contact gestures that do not require the user to visually focus on a touchscreen or other input device. In addition, mid-air gestures are not limited by the size of the computing device receiving the input. A further advantage is that a user can receive acknowledgment of such non-contact input from the computing device via multiple feedback modes that do not require the user to visually focus on a display device. Instead, in the embodiments, feedback modes are employed that are based on the user's peripheral vision, sense of touch, and/or hearing.

1. In some embodiments, a system for interacting with a computing device includes a visual projection system configured to project a visual output onto a projection surface; and a haptic output device configured to deliver a haptic output to a surface of a body part of the user while the visual projection system projects the visual output onto the projection surface.

2. The system of clause 1, wherein the projection surface comprises the surface of the body part of the user.

3. The system of clauses 1 or 2, wherein the visual output is collocated with the haptic output on the projection surface.

4. The system of any of clauses 1-3, further comprising an interaction sensor configured to detect that the surface of the body part is disposed within an interaction region.

5. The system of any of clauses 1-4, further comprising a processor configured to execute instructions to: receive a signal from the interaction sensor indicating that the surface of the body part is disposed within the interaction region; and in response to receiving the signal, cause the haptic output device to deliver the haptic output to the surface of the body part.

6. The system of any of clauses 1-5, further comprising a processor configured to execute instructions to: determine a location of the surface of the body part based on a position signal from the interaction sensor; and cause the haptic output device to deliver the haptic output to the surface of the body part based on the position signal from the interaction sensor.

7. The system of any of clauses 1-6, further comprising a processor configured to execute instructions to: determine, based on a position signal from the interaction sensor, a location of the surface of the body part; and cause the visual projection system to project the visual output onto the location.

8. The system of any of clauses 1-7, further comprising: a projection surface sensor configured to generate shape and orientation information associated with the projection surface; and a processor configured to execute instructions to receive the shape and orientation information, generate a mapped visual output based on the shape and orientation information, and cause the visual projection system to project the mapped visual output onto the projection surface.

9. The system of any of clauses 1-8, wherein the projection surface comprises a surface of the body part of a user that has a shape that substantially distorts the visual output when the visual output is projected thereon.

10. The system of any of clauses 1-9, further comprising a gesture-sensing module configured to: recognize a gesture performed by a user; and generate a signal indicating the gesture performed by the user.

11. The system of any of clauses 1-10, wherein the projection surface includes the surface of the body part of the user and the processor is further configured to execute instructions to cause the haptic output device to deliver the haptic output to the surface of the body part while causing the visual projection system to project the acknowledging visual output onto the projection surface.

12. The system of any of clauses 1-11, wherein: the haptic device includes an ultrasonic transducer configured to direct to the surface of the body part an ultrasonic signal that is configured to demodulate, upon delivery to the surface of the body part, to an audible output; and the processor is further configured to execute instructions to cause the ultrasonic transducer to direct the ultrasonic signal to the surface of the body part in response to receiving the signal indicating the gesture performed by the user.

13. The system of any of clauses 1-12, wherein the processor is further configured to execute instructions to cause the ultrasonic transducer to direct the ultrasonic signal to the surface of the body part while the haptic output device delivers the haptic output to the surface of the body part of the use.

14. The system of any of clauses 1-13, wherein: the haptic output device includes an ultrasonic transducer configured to output a location detection ping and an ultrasonic transducer configured to detect an echo of the location detection ping; and the processor is further configured to execute instructions to: receive an echo detection signal from the ultrasonic transducer configured to detect the echo, and determine a location of the surface of the body part of the user based on the echo detection signal.

15. The system of any of clauses 1-14, wherein the processor is further configured to execute instructions to cause the haptic output device to deliver the haptic output to the surface of the body part based on the location of the surface of the body part.

16. In some embodiments, a system for generating a closed interaction loop comprises: a visual projection system configured to project a visual output onto a projection surface; an ultrasonic transducer configured to direct to a surface of a body part of a user an ultrasonic signal that is configured to demodulate, upon delivery to the surface of the body part, to an audible output, wherein the surface of the body part is proximate the projection surface; and an interaction sensor configured to detect that the surface of the body part is disposed within an interaction region.

17. The system of clause 16, further comprising a processor configured to execute instructions to: receive a signal from the interaction sensor indicating that the surface of the body part is disposed within the interaction region; and in response to receiving the signal, cause the visual projection system to project the visual output onto the projection surface while simultaneously causing the ultrasonic transducer to direct to the surface of the body part the ultrasonic signal.

18. In some embodiments, a method for generating a gesture-based interface with a computing device comprises: detecting a body part of a user within an interaction region; and in response to detecting the body part within the interaction region: delivering a first haptic output to a portion of the surface of the body part; and while delivering the first haptic feedback to the portion of the surface, directing an ultrasonic signal to the portion of the surface of the body part, wherein the ultrasonic signal is configured to demodulate, upon delivery to the surface of the body part, to an audible output.

19. The method of clause 18, further comprising, in response to receiving a signal indicating a gesture is performed by the user, delivering a second haptic output to the portion of the surface.

20. The method of clauses 18 or 19, further comprising, in response to receiving a signal indicating a gesture is performed by the user, causing a visual projection system to project an acknowledging visual output onto the portion of the surface.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for interacting with a computing device, the system comprising:
    a visual projection system configured to project a visual output onto a projection surface;
    a haptic output device configured to deliver a haptic output to a surface of a body part of a user while the visual projection system projects the visual output onto the projection surface; and
    an ultrasonic transducer configured to generate desired audio feedback that appears to emanate from the surface of the body part;
    a gesture-sensing module configured to recognize a gesture performed by the user and generate a signal indicating the gesture performed by the user; and
    a processor configured to execute instructions to cause the ultrasonic transducer to direct an ultrasonic signal to the surface of the body part in response to receiving the signal indicating the gesture performed by the user.

2. The system of claim 1, wherein the projection surface comprises the surface of the body part of the user.

3. The system of claim 2, wherein the visual output is collocated with the haptic output on the projection surface.

4. The system of claim 2, further comprising an interaction sensor configured to detect that the surface of the body part is disposed within an interaction region.

5. The system of claim 4, wherein the processor is further configured to execute instructions to:
    receive a signal from the interaction sensor indicating that the surface of the body part is disposed within the interaction region; and
    in response to receiving the signal, cause the haptic output device to deliver the haptic output to the surface of the body part.

6. The system of claim 4, wherein the processor is further configured to execute instructions to:
    determine a location of the surface of the body part based on a position signal from the interaction sensor; and
    cause the haptic output device to deliver the haptic output to the surface of the body part based on the position signal from the interaction sensor.

7. The system of claim 4, wherein the processor is further configured to execute instructions to:
    determine, based on a position signal from the interaction sensor, a location of the surface of the body part; and
    cause the visual projection system to project the visual output onto the location.

8. The system of claim 1, further comprising:
    a projection surface sensor configured to generate shape and orientation information associated with the projection surface; and
    wherein the processor is further configured to execute instructions to receive the shape and orientation information, generate a mapped visual output based on the shape and orientation information, and cause the visual projection system to project the mapped visual output onto the projection surface.

9. The system of claim 8, wherein the projection surface comprises the surface of the body part of the user that has a shape that substantially distorts the visual output when the visual output is projected thereon.

10. The system of claim 1, wherein:
    the projection surface includes the surface of the body part of the user; and the processor is further configured to execute instructions to cause the haptic output device to deliver the haptic output to the surface of the body part while causing the visual projection system to project a visual output acknowledging the gesture onto the projection surface.

11. The system of claim 1, wherein:
    the ultrasonic transducer is further configured to direct to the surface of the body part an ultrasonic signal that is configured to demodulate, upon delivery to the surface of the body part, to generate the desired audio feedback.

12. The system of claim 11, wherein the processor is further configured to execute instructions to cause the ultrasonic transducer to direct the ultrasonic signal to the surface of the body part while the haptic output device delivers the haptic output to the surface of the body part of the user.

13. The system of claim 1, wherein:
    the haptic output device includes an ultrasonic transducer configured to output a location detection ping and an ultrasonic transducer configured to detect an echo of the location detection ping; and
    the processor is further configured to execute instructions to:
        receive an echo detection signal from the ultrasonic transducer configured to detect the echo, and
        determine a location of the surface of the body part of the user based on the echo detection signal.

14. The system of claim 13, wherein the processor is further configured to execute instructions to cause the haptic output device to deliver the haptic output to the surface of the body part based on the location of the surface of the body part.

15. A system for generating a closed interaction loop, the system comprising:
    a visual projection system configured to project a visual output onto a projection surface;
    an ultrasonic transducer configured to direct to a surface of a body part of a user an ultrasonic signal that is configured to demodulate, upon delivery to the surface of the body part, to an audible output, wherein the surface of the body part is proximate the projection surface;
    a gesture-sensing module configured to recognize a gesture performed by the user and generate a signal indicating the gesture performed by the user; and
    a processor configured to execute instructions to cause the ultrasonic transducer to direct the ultrasonic signal to the surface of the body part in response to receiving the signal indicating the gesture performed by the user.

16. The system of claim 15, wherein the processor is further configured to execute instructions to:
    receive a signal from an interaction sensor indicating that the surface of the body part is disposed within an interaction region; and in response to receiving the signal, cause the visual projection system to project the visual output onto the projection surface while simultaneously causing the ultrasonic transducer to direct to the surface of the body part the ultrasonic signal.

17. A method for generating a gesture-based interface with a computing device, the method comprising:
   recognizing a gesture performed by a user; and
   in response to recognizing the gesture performed by the user:
      delivering a first haptic output to a portion of a surface of a body part of the user; and
      while delivering the first haptic output to the portion of the surface, directing an ultrasonic signal to the portion of the surface of the body part, wherein the ultrasonic signal is configured to demodulate, upon delivery to the surface of the body part, to an audible output.

18. The method of claim 17, further comprising, in response to receiving a signal indicating the gesture is performed by the user, delivering a second haptic output to the portion of the surface.

19. The method of claim 17, further comprising, in response to receiving a signal indicating the gesture is performed by the user, causing a visual projection system to project a visual output acknowledging the gesture onto the portion of the surface.

* * * * *